COUNTERS FOR FLAT AND ROTARY EMBOSSING DIES

Filed Feb. 21, 1968 2 Sheets-Sheet 1

INVENTORS
Stanley W. Otto
Seth W. Warrell

BY Schmidt, Johnson, Hovey, Williams & Bradley
ATTORNEYS

Jan. 5, 1971 S. W. OTTO ET AL 3,552,237

COUNTERS FOR FLAT AND ROTARY EMBOSSING DIES

Filed Feb. 21, 1968 2 Sheets-Sheet 2

INVENTORS
Stanley W. Otto
Seth W. Warrell

BY Schmidt, Johnson, Hovey, Williams & Bradley
ATTORNEYS

United States Patent Office 3,552,237
Patented Jan. 5, 1971

3,552,237
COUNTERS FOR FLAT AND ROTARY EMBOSSING DIES

Stanley W. Otto, Kansas City, Mo., and Seth W. Warrell, Shawnee Mission, Kans., assignors to Hallmark Cards, Incorporated, Kansas City, Mo., a corporation of Missouri Filed Feb. 21, 1968, Ser. No. 707,218
Int. Cl. B21k *5/20*
U.S. Cl. 76—107 13 Claims

ABSTRACT OF THE DISCLOSURE

A premade, molded, translucent, thermosetting synthetic resin counter for use against a modeled embossing die. Background relief and paper clearance are both provided in the modeled design surface of the counter. The counter is formed off of the press by first preparing a mask using pressure sensitive film developed against the die or an artist-engraved master thereof followed by fixing of the film so that the design area is opaque and the remainder transparent. A sheet of photosensitive material of a thickness equal to the desired paper clearance is exposed through the mask and then developed to remove the protected portions thereof which correspond to the design. The counter matrix is molded against a laminate made up in successive order of the die or master, the developed photosensitive material and a layer of lead foil of a thickness equal to the paper clearance required in the counter.

This invention relates to the field of graphic arts and especially processes, apparatus and products which significantly improve the preparation of counters utilizable with flat as well as rotary embossing dies usable to impress various materials such as paper, plastic or thin metal sheets.

The invention provides methods of forming premade, molded, translucent, thermosetting synthetic resin counters for use against flat or rotary molded embossing dies and which have both background relief around the design portion of the counter as well as paper clearance in the modeled surface thereof, so that cutting of the sheet material being embossed is precluded, and there is no tendency for the die and counter assembly to iron the sheet material around the design or effect de-embossing thereof. As an incident of the novel procedures for preparing premade counters, makeready of the die and counter on a press is facilitated and the time-consuming and costly hand operations previously necessary in the preparation of the counter for use with a rotary or flat embossing die is avoided. In addition, the fabrication procedures lend themselves to forming of as many counters as may be required from a single die or master representation thereof, in a much less costly manner than has heretofore been available.

Off-press makeready of the die and counter assembly minimizes the down time of the press and also frees the operator to concentrate on actual production runs instead of spending a considerable part of his time on setting up the machine for each specific run.

It has long been appreciated that the appearance and visual effect of many printed designs, especially on paper products, may be enhanced by embossing the sheet to give a modeled appearance thereto. Similarly, artistic designs in the form of a modeled or three-dimensional embossed relief in sheet materials have been known for a long time to provide a more pleasing visual image, with or without multicolor printing thereover. Similar embossing operations have also been carried out on thin metal sheets to produce a raised or embossed design therein. Embossing of thermoplastic synthetic resin sheets is also a conventional practice. The art in this area has become very highly developed in connection with greeting cards, calendars, paper party goods, decorative wrapping and decorative accessories, with the quality of the embossed design and the alignment of the embossed area with the printed image being especially critical because of the normally relatively close visual observation which is made of the design by a recipient or purchaser of the item.

Since the designs used in connection with the products referred to above are very often relatively intricate and involve particular skill as to the height of each embossed area in relation to the surrounding portions of the design, the art of preparing modeled master plates usable in the production of embossing dies is highly specialized and practiced by extremely skilled engravers having long experience in their field. Although the engraved plate could be used as a die, because of the high cost of preparing the original masters, it is conventional to treat the same with great care and maintain them on file for possible future use. It is the usual practice to prepare duplicates of the original master plate, either of a relatively warp-free and wear resistant material such as a thermosetting synthetic resin, or an electroformed metal substantially free of stresses such as nickel. In addition, because of the value of the original engraved plates, efforts are taken to preclude damage thereto as well as warpage or other physical alteration which would preclude their future use in the preparation of additional dies and counters therefrom as needed for production operations, especially those of high volume as is the case in connection with the printing of greeting cards and related items as previously mentioned.

Since the hand engraving of a design in an original plate is a time-consuming and laborious job at best, it is conventional in this field to use a magnesium alloy plate for preparation of the die master, because of the ease with which this alloy may be gouged, scraped, scratched or ground with hand and power tools to form an intaglio design therein corresponding to the embossed design to be formed in a sheet of material. Suitable magnesium alloys for this purpose include small amounts of aluminum, zinc, lithium, cadmium and other agents, and are distributed under various trade names. Exemplary alloys are Zomag by Atlantic Zinc Works, Dowmetal by Dow Chemical Company, and Magplate by Magplate Corporation. However, it is to be understood that the techniques and advantages of this invention are not limited to the utilization of magnesium alloy materials for preparation of the master plate, but other equivalent and equally satisfactory metals may be used such as copper, brass, steel and aluminum which lend themselves to hand engraving.

Although various die reproduction processes have been in practice for some time, many of which involve phenolic molding and electroforming systems, no really satisfactory procedure has heretofore been available for the preparation of counters from an embossing die or the master plate thereof, provided with both background relief and paper clearance, and adapted for fabrication on a fully reproducible basis prior to assembly of the counter and die on a press.

Because of the intricacy of the design and the three-dimensional nature of the relief to be embossed in a sheet of material, past counter preparation methods have for the most been accomplished by rather laborious manual construction of a backup member mounted on the makeready of the press utilizing the die itself as an impression device. For example, counters for use with dies adapted to emboss paper sheets using a reciprocable press, were usually prepared from a stack of paper sheets on the makeready plate which were run in against the die. After a discernible image had been formed in the uppermost sheets of the stack of papers, the makeready or counter plate was then removed from the machine so that the operator could hand cut around the design and thus relieve the area in surrounding relationship to the impression formed in the paper and thereby provide background relief to prevent cutting of the material around the design during embossing thereof, or excessive ironing and possible de-embossing of the design during impression thereof. It was generally necessary for the press operator to remove the makeready plate from the machine a number of times to produce a full image where the cutout was relatively close to the edges of the design so as to provide a full support for the embossed area.

In addition, it was normally found necessary to provide a rough cut around the design and then add additional sheets which were cut to conform substantially to the design so that the counter edge was relatively accurate with respect to the shape of the die edges. However, in all instances, this was done by hand using the technique of slowly adding sheets of paper which were pasted one on the top of another. Frequently, it was found necessary to add small bits of paper in certain areas where additional buildup was necessary and to provide a raised area on the counter conforming to the configuration of the modeled surface of the die. The amount of buildup required was dependent upon the depth of a particular area of the design and the extent of relief of the die surface.

The usual manner of providing paper clearance in the counter involved placement of at least one sheet of paper over the counter constructed manually as described above, and causing the die platen to move downwardly and impress the sheet of material against the counter a sufficient number of times that the counter was compressed to an extent to compensate for at least a part of the thickness of the paper. This running in of the counter with a piece of paper thereover was only partly satisfactory because of the differences in the compressibility of the counter depending upon the thickness thereof, and the fact that the counter itself at best only roughly conformed to the shape of the design in the die.

It can be appreciated that hand construction and run-in of counters in accordance with the previously practiced methods was very time-consuming and expensive, not only because of the operator attention required thereto but also because of the necessary down time of the press while each counter was being brought into usable form. Each time additional sheets of paper were added to the counter it was necessary to remove the makeready plate from the press and thereafter cut around the design using a hand held knife. Preparation of counters heretofore required as much as 18 hours and very rarely was less than 4 hours.

It is therefore the primary object of the present invention to provide an improved method of forming counters for use against flat and rotary embossing dies which may be fabricated off of the press and mounted thereon in precise alignment with a die without run-in and hand makeready heretofore required.

It is another very important object of the invention to provide a premade, molded, translucent, thermosetting synthetic resin counter which is constructed from an artist-engraved master plate or a die constructed therefrom, utilizing novel techniques which result in the construction of a counter having both background relief and paper clearance. In this connection, it is an important object of the invention to provide a counter having the characteristics noted which more accurately reflects the shape of the embossing die cavity than is the case with hand made counters, especially where relatively intricate designs are involved, notwithstanding the fact that the counters may be formed off of the press to minimize the down time of the latter and at the same time be made up in a fraction of the time required for the preparation of a hand made counter, thus effecting economies in all phases of the embossing operation. The counter production process also lends itself to setting up a separate facility for this purpose which may be remote from the presses if desired, and employing personnel who need be skilled only in the steps of fabricating the counters and dies usable thereagainst.

The master plates previously described having an intaglio relief therein corresponding to the design to be embossed in a sheet of material, constitute the only masters available of the modeled design since each master is usually prepared from a line drawing which inherently is not three-dimensional in character. Thus, the procedures used for providing background relief and paper clearance in the counter must necessarily be initiatable from the engraved master plate or the die duplicate prepared therefrom, without benefit of any other representation of the design. It is therefore another very important object of the invention to provide a process of preparing a premade, molded counter having both paper clearance and background relief, which can be fabricated direct from the original engraved plate or a die formed therefrom, while at the same time permitting the construction of as many counters as desired from the original plate or its duplicate. A still further important object of the invention is to provide a process for preparing a premade, molded translucent counter which may be constructed from the artist-engraved plate or a duplicate thereof, by virtue of the fact that advantage is taken of pressure sensitive films to produce a mask havig opaque areas corresponding to the intaglio design in the master or die, while the remainder of the film is clear for passage of light therethrough. The developed pressure sensitive film therefore gives an accurate representation of the outline of the design without reference to the depth of the design throughout its extent in the original engraved plate. Preparation of a mask as described permits the utilization of a photosensitive sheet material as a means for providing a required amount of background relief in the final counter matrix. By selecting a photosensitive material in sheet form of a thickness substantially equal to the amount of background relief desired in the counter matrix, the photosensitive material can be exposed through the mask and then developed to cause the areas thereof protected by the opaque sections of the mask to be washed away and which thereby correspond to the design. It is thus another important object of the invention to provide background relief in the counter by molding the same against either the die or the original master thereof, with the developed photosensitive sheet being positioned between the counter material and the die or master plate so that the photosensitive sheet thus causes the counter to be relieved in surrounding relationship to the design.

Also a significant object of the invention is the provision of a method of preparing a premade, molded, translucent, thermosetting synthetic resin counter for use against a modeled embossing die wherein the counter is sufficiently relieved across the modeled surface thereof to provide the same or even better degree of paper clearance as has heretofore been inherent in the hand makeready operations utilizing run-in of a number of paper sheets disposed in stacked relationship. Such paper clearance is produced by positioning of a layer of incompressible, pressure deformable material such as lead foil of predetermined thickness over the developed thermosensitive sheet as the counter is molded thereagainst, whereby upon removal of the molded counter from the composite assembly made up of the original engraved plate or die, the developed photosensitive sheet and the lead foil, the molded matrix may be used directly as a counter against the die. Lead foil is a particularly advantageous material to provide paper clearance because it is substantially incompressible but readily conforms under pressure to the configuration of the intaglio design in the assembly of the developed photo-sensitive sheet and the die or master plate thereunder, and without significant variation in the thickness of the lead foil in the compression step. By choosing lead foil of a thickness substantially equivalent to the paper clearance desired for a particular counter, automatic compensation is provided during molding of the counter and which extends across the entire modeled surface thereof.

Another important object of the invention is to provide a process for preparing premade molded counters usable against modeled embossing dies, which are fabricated off of the press and wherein novel procedures are used to maintain accurate alignment between the constituent elements used in fabrication of the molded counter so that the modeled surface thereof accurately conforms to and precisely mates with the intaglio relief of the embossing die.

Figures 11, 12, 13:
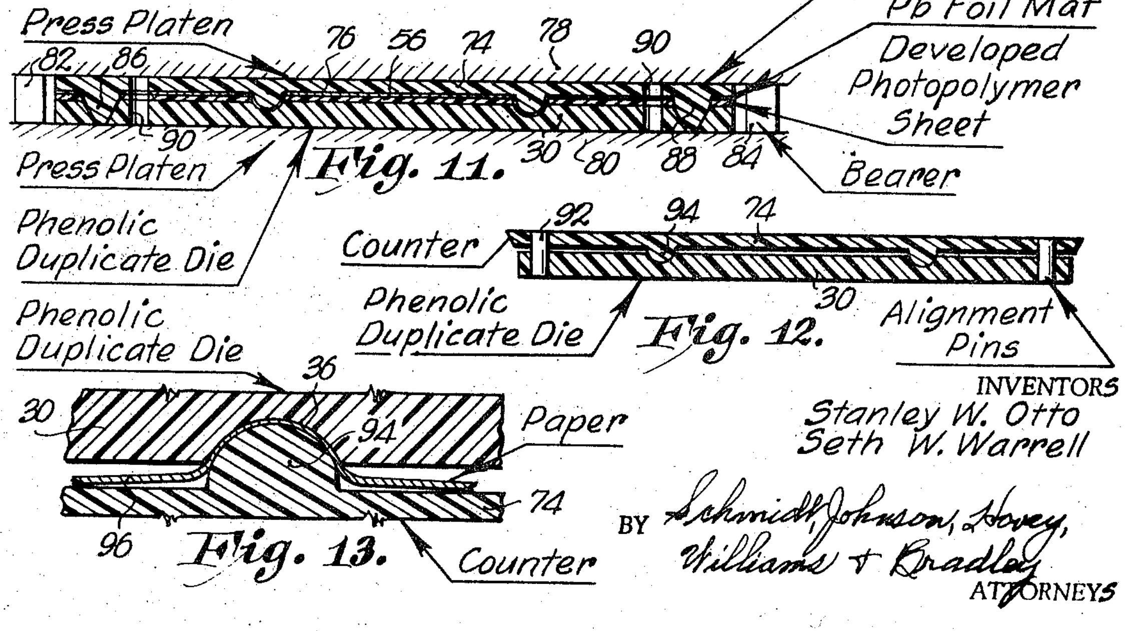
FIG. 11 is a schematic cross-sectional showing of apparatus for molding a counter against a laminate made successively of the phenolic duplicate die, the developed photopolymer sheet thereover, and a layer of lead foil against the photopolymer and with holes being drilled through the assembly to provide passages for alignment pins.

FIG. 12 is a cross-sectional view of the assembly shown in FIG. 11 removed from the molding apparatus and showing pins in the alignment holes to maintain the parts in correct alignment; and FIG. 13 is an enlarged, cross-sectional, schematic representation of the phenolic duplicate die and counter therefor showing the configuration thereof at a part of the design reproduced from the original master plate, and illustrating the relationship of the die and counter to a sheet of paper impressed therebetween.

It is to be understood that all of the vertical cross-sectional views described above are taken essentially on an irregular, substantially Z-shaped line for cross-referencing of the figures and to give an indication of the relative positions of the alignment bosses and pins used in the present process to maintain alignment of the components during fabrication of the counter.

In accordance with the preferred procedure of the invention, the original master plate 10 is of magnesium alloy as previously described and has an intaglio design 12 in the upper face 14 thereof defined by relieved area 16 which for purposes of illustration only has been shown as a circular groove. It is to be appreciated though, that the intaglio design will vary in intricacy and depth in accordance with the image to be embossed in metal, plastic or paper sheet stock. The intaglio relief provided by annular area 16 in plate 10 is conventionally formed by artists using engraving tools to gouge, grind, scratch or in any other manner wear away the surface of the plate. A magnesium alloy material is normally used for this purpose because of the ease with which the same may be worked. However, as explained previously, other equivalent materials may be used for this purpose so long as they have the required characteristics of resistance to warpage, able to withstand molding temperatures and dimensionally stable under varying conditions, particularly if the plate is to be used as a female embossing die.

It is also preferred that plate 10 be provided with at least a pair of conical alignment or register holes 18 and 20 which may be formed with a combination drill and countersink drilled in such manner that the conical holes increase in diameter as the face 14 of plate 10 is approached and preferably located at diagonally opposite corners of the plate.

Since master plate 10 in its preferred form is of magnesium alloy, it is used as a form for preparing dies and counters therefrom but is not in itself employed as a die because of the value thereof, the fact that it is made up of relatively soft malleable metal for ease of engraving and therefore does not have a high resistance to wear, and further because of the desirability of retaining the master for preparation of any number of dies and counters therefrom as may be needed at a future time.

Figures 1, 2, 3, 4, 5:
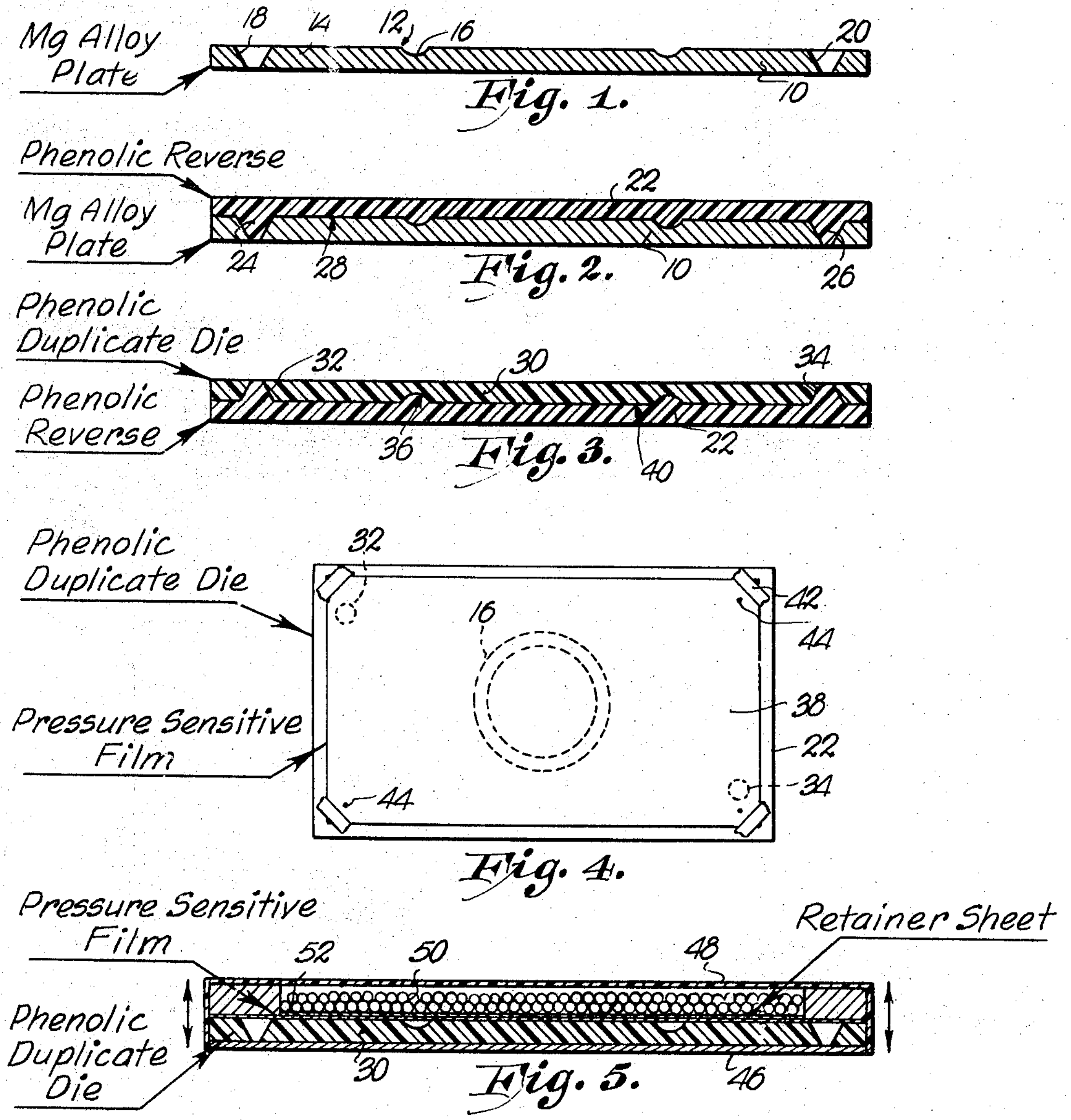
FIG. 1 is a cross-sectional view taken on substantially a Z-shaped line of a generally rectangular, exemplary artist-engraved master plate having a representative intaglio design in one surface thereof, along with conical alignment depressions in opposite corners of the same.
FIG. 2 is an essentially schematic cross-sectional representation of the engraved master plate shown in FIG. 1, and illustrating a phenolic reverse of the plate molded thereagainst, both taken on substantially the same section line as FIG. 1.
FIG. 3 is another essentially schematic, cross-sectional representation of the phenolic reverse of FIG. 2, and showing a phenolic duplicate die thereover.
FIG. 4 is a plan view of the phenolic duplicate die of FIG. 3 on a reduced scale and showing a pressure sensitive film taped over the modeled surface thereof.
FIG. 5 is a schematic showing of apparatus for developing the pressure sensitive film against the surface of the phenolic duplicate die and showing the way in which a multiplicity of moving balls are used for development purposes.
Figure 6:
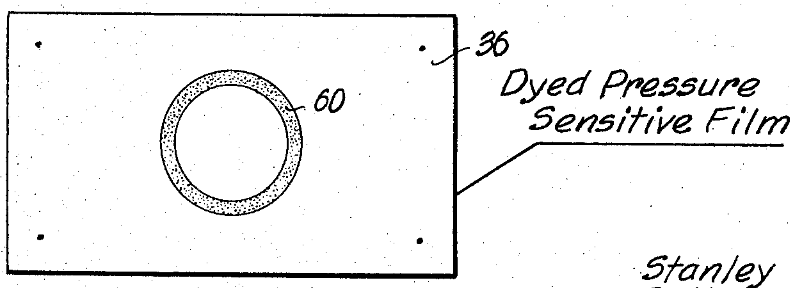
FIG. 6 is a plan view of the developed pressure sensitive film on a reduced scale and showing the appearance thereof after dyeing of the film.

FIGS. 2 and 3 schematically show a preferred procedure for preparing a phenolic duplicate die from master plate 10 for use on the embossing machine. In accordance with this procedure, a reverse 22 is molded against the face 14 of plate 10 preferably using a thermosetting phenolic type synthetic resin material such as a product manufactured by Monomelt Company of Minneapolis, Minn. and sold under the designaton 95D and 96D. This phenolic type resin is reinforced with glass fiber cloth and sheets thereof of the desired thickness are most advantageously formed against plate 10 under heat and pressure in a plate molding machine, which for example may be an Acraplate machine manufactured by Lake Erie Engineering Corp. of Buffalo, N.Y. It is to be noted that the molding operation forces resin into the register holes 18 and 20 to form opposed integral register cones 24 and 26. Similarly, the resin composition is forced into the relieved area 16 to form a corresponding raised design in the face 28 of phenolic reverse 22.

Next, a phenolic duplicate die 30 is molded against the phenolic reverse 22 after separation of the master plate 10 therefrom, again using a thermosetting synthetic resin reinforced with glass fiber cloth. In this instance, the preferred molding composition is a product distributed by Wilsolite Corporation of Buffalo, N.Y., under the designation of BMP 61. This is also a phenolic type resin having superior shrink resistance and durability. Since the phenolic duplicate die 30 is molded against the face 28 of reverse 22, the die thus formed has conical alignment holes 32 and 34 therein which correspond with holes 18 and 20 in plate 10. In addition, the die has a relieved area 36 which corresponds exactly with design 12.

In order to avoid possible damage to the original master plate 10, the phenolic duplicate die 30 is used in the preparation of counters usable thereagainst, although it is to be understood that the plate 10 can be used as the form for fabrication of the counters if desired. However, molding of the counters against duplicate die 30 or replicas thereof, has the advantage of causing the counter to accurately conform to the duplicate die if it varies in any significant respect from the original master plate 10 because of slight shrinkage of the resin material during curing thereof. The assembly of the reverse 22 and duplicate die 30 is broken apart and the master plate 10 stored in a safe place.

A sheet of pressure sensitive film 38 is affixed to the modeled face 40 of duplicate die 30 using means such as short pieces of pressure sensitive tape 42 located at respective corners of the rectangular film sheet 38. At this juncture, it is preferred that a sharp instrument such as an awl be used to form a plurality of aligned holes 44 in the pressure sensitive film 38 and underlying phenolic duplicate die 30 respectively for realignment purposes. An easily observable opening and corresponding depression in the film 38 and die 30 may be formed by simply forcing the sharp end of the awl downwardly through the film and into the underlying resin die.

The pressure sensitive film 38 is preferably of the type having a transparent synthetic resin backing element provided with a coating thereover presenting a large number of discrete, relatively small, pressure rupturable cells. Upon ruture of the cells, the translucent or generally opaque coating is destroyed to an extent whereby the transparent backup element is fully exposed on both sides thereof for unimpeded viewing therethrough. A particularly useful pressure sensitive film for this purpose is manufactured and distributed by the Photo Products Department of E. I. du Pont de Nemours and Co., Wilmington, Del., and sold under the trademark Cronapress.

The assembly of FIG. 4 is then placed in a clarifier or conversion machine such as Du Pont's Cronapress 100 Clarifier, which is illustrated schematically in FIG. 5. The clarifier has a supporting plate 46 which receives the phenolic duplicate die 30 so that the pressure sensitive film 38 faces upwardly. It is to be understood that film 38 is positioned on die 30 with the emulsion side thereof facing the modeled surface of the die. The vacuum frame 48 is then lowered into place so that the series of small steel balls 50 therein rest on the vacuum cover sheet 52 engaging the upper surface of film 38. Vacuum is applied to cause the cover sheet 52 to force the film 38 into close adhering relationship to the face 40 of duplicate 30. Vibration inducing mechanism forming a part of the clarifier is then actuated to cause the balls 50 to bounce up and down at a relatively high rate of speed. In this way, the balls produce rapid, random, repetitive point applied strikes or forces on the surface of film 38 which is supported by the modeled duplicate die 30. As a consequence, in each case where a ball 50 strikes the film 38 at a point where such film is supported by an unrelieved area of duplicate die 30, the corresponding cells in the coating on the underface of the film 38 will be ruptured and thereby rendering that part of the film transparent. However, in the case of relieved area 36, support is not provided for film 38 of such nature that impingement of balls 50 on the annular area of film 38 overlying design-defining area 36 will effect rupture of the cells at those points. The overall design 12 is thereby surrounded by transparent sections in the developed film 38.

The assembly shown in FIG. 5 is then removed from the clarifier and the emulsion face thereof is successively subjected to densifier and stabilizer solutions which render the remaining emulsion part of the film opaque. Suitable densifier and stabilizer solutions are also distributed by Du Pont under the Cronapress designation. These materials turn the unruptured part of the emulsion a dark blue opaque color which is stabilized by application of the stabilizer solution to the dyed surface.

The developed pressure sensitive film 38 is removed from the phenolic duplicate die 30, and the latter secured to the upper face of a lower platen press member 54 with the modeled surface 40 thereof facing upwardly. A sheet 56 of photosensitive synthetic resin material is then placed over the modeled face 40 of duplicate die 30 and caused to be adhesively secured thereto through use of a suitable adhesive or solvent agent for the synthetic resin. A preferred photosensitive material is manufactured and distributed by E. I. du Pont de Nemours & Co., Wilmington, Del., under the trademark Templex. U.S. Pat. No. 3,306,745 describes a photopolymer of this type which for certain applications may be supported by a metal backing. However, in the present instance, it is contemplated that the synthetic resin sheet be used in its unsupported form and which comprises a flexible member which is transparent in character but sensitive to ultraviolet light.

Templex is especially useful for the present purposes since it is available in a thickness of 0.020 which is particularly desirable for providing background relief in a counter molded against the phenolic duplicate die 30 while covered with the sheet of Templex 56 as will be explained. A preferred solvent agent for affixing Templex to the phenolic duplicate die 30 is $HCON(CH_3)_2$. The upper platen press member 58 is then brought downwardly into engagement with the upper surface of sheet 56 to force the latter into firm engagement with the molded face 40 of die 30.

Figure 7:
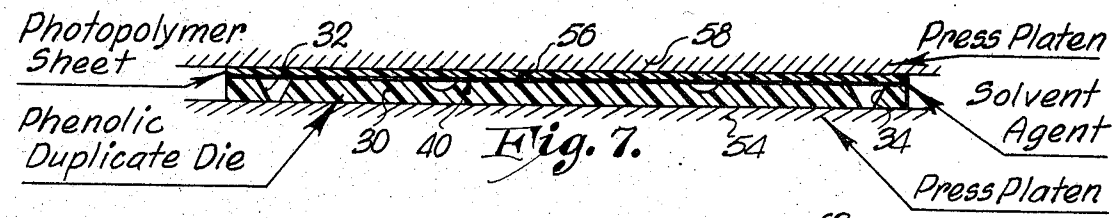
FIG. 7 is a schematic cross-sectional showing of the phenolic duplicate die of FIG. 3, and showing the die mounted in a suitable press with a sheet of photopolymer material affixed to the modeled surface thereof through use of a solvent agent.

The laminate illustrated in FIG. 7 is removed from the press and dyed film 38 placed over sheet 56 using the holes 44 to effect registration of the film with the phenolic duplicate die 30. In this manner, the opaque design area 60 of film 38 is exactly aligned with the relieved area 36 of die 30. Again, small pieces of pressure sensitive tape 62 may be used to secure film 38 to sheet 56.

Figure 8:
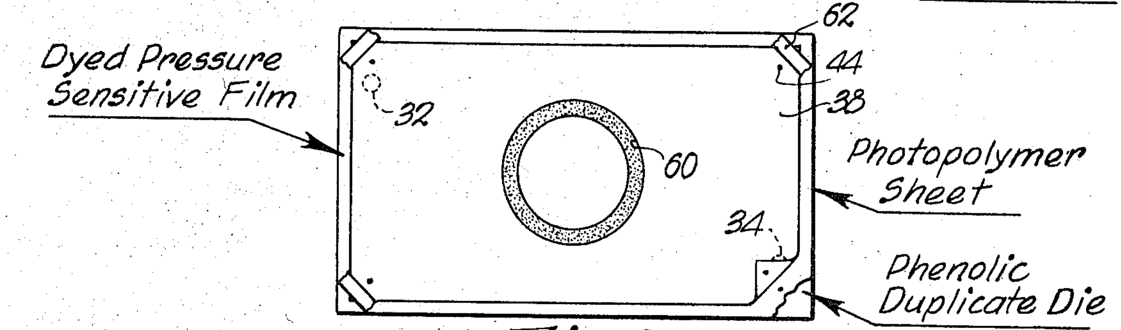
FIG. 8 is a plan view of the phenolic duplicate die with the photopolymer sheet thereover, and having the dyed pressure sensitive film of FIG. 6 taped to the upper face of the photopolymer in alignment with the intaglio design in the phenolic duplicate die.
Figures 9, 10:
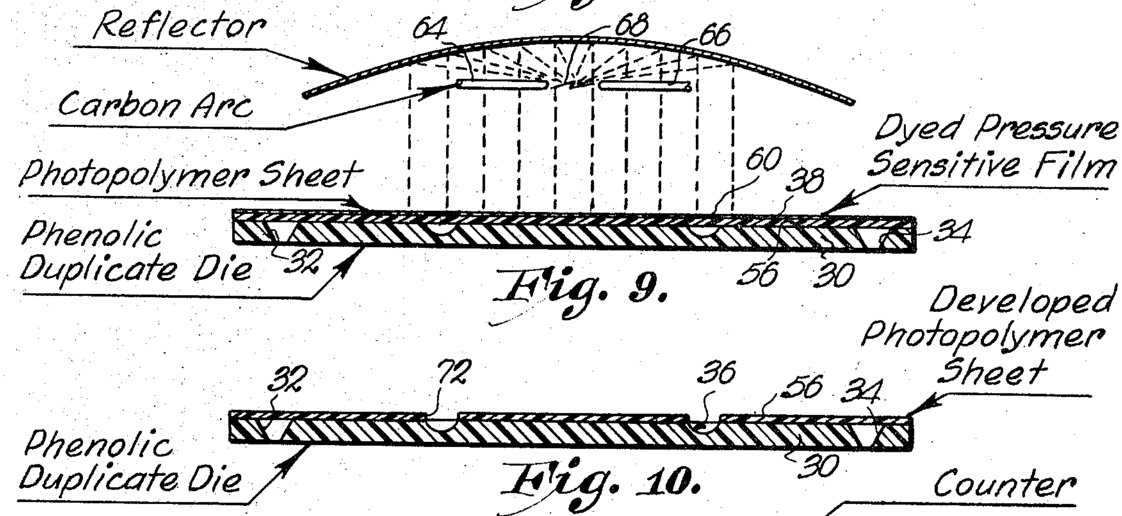
FIG. 9 is an essentially schematic, cross-sectional representation of the assembly of FIG. 8 and showing one way in which the photopolymer sheet may be exposed using a carbon arc.
FIG. 10 is an essentially schematic, cross-sectional representation of a composite assembly made up of the phenolic duplicate die and the photopolymer sheet after developing thereof to remove the unhardened portions of the photopolymer which correspond to the design in the master plate of FIG. 1.

The assembly illustrated in FIG. 8 is then exposed to a source of ultraviolet rays preferably constructed so as to direct such rays through the film 38 onto the sheet 56 in substantially perpendicular relationship to the planar surfaces thereof as illustrated in FIG. 9. In this instance, the spaced electrodes 64 and 66 which produce an arc 68 are positioned in front of a reflector 70 which serves to direct the ultraviolet rays onto the photosensitive material 56 in essentially straight lines. It is to be appreciated that in actual practice, the ultraviolet source will be spaced a considerably greater distance away from the photosensitive material 56 than is indicated only schematically in FIG. 9. In addition, lens systems may be employed between the ultraviolet source and the photosensitive synthetic resin material to assure that the ultraviolet rays are directed to sheet 56 in perpendicular relationship to the upwardly facing surface thereof. Those parts of the sheet 56 which are exposed to the ultraviolet rays are caused to undergo further polymerization and thereby harden while the areas of the sheet 56 underlying opaque area 60 of film 38 remain unhardened and may be removed by a conventional alkaline wash solution distributed by Du Pont in connection with its Templex material. In any event, the unhardened areas of the photosensitive material are washed away as indicated in FIG. 10, to leave an opening or openings corresponding to the configuration of the design 12. The principal reason for taking steps to cause the ultraviolet rays emitted by the carbon arc to pass substantially vertically onto the surface of sheet 56, is to cause the walls of the photosensitive material defining openings 72 thereof to be substantially perpendicular to opposed planar faces of the sheet and thereby align exactly with the edges of relieved area 36 of phenolic duplicate die 30.

The counter 74 is formed against a layer of lead foil 76 which is placed over the face of sheet 56 as illustrated in FIG. 10, using a compression molding machine such as the Acraplate equipment previously described, and capable of applying both heat and pressure to the sandwich made up of duplicate die 30, sheet 56, foil 76 and the initially planar sheet of a thermosetting synthetic resin material making up counter 74. The upper and lower platens 78 and 80 of the molding machine are illustrated schematically in FIG. 11, with the extent of reciprocation thereof toward one another being limited by opposed bearers 82 and 84.

The thickness of lead foil 76 necessarily varies with the required paper clearance for a particular type of paper to be formed against counter 74 but in most instances, the foil will be of a thickness approximately two-thirds of the thickness of the paper stock to be embossed.

Lead foil is admirably suited for use as a paper clearance medium in the molding of counter 74 using duplicate 30 covered with developed photosensitive material 56, because the lead is pressure deformable to the exact configuration of the laminate against which the same is pressed, but does not significantly vary in its thickness throughout the extent thereof, when forced into pressure relationship with the laminate of FIG. 10.

In addition, the lead foil does not adhere to either the sheet 56 or area 36 of die 30 and may be readily removed therefrom. The very smooth even surface presented by the lead foil for molding of counter 74 thereagainst is also an advantage in connection with the use of this material as a means of providing paper clearance in the modeled surface of the counter.

In this respect, counter 74 is preferably constructed of an initially planar sheet of synthetic resin material suitably reinforced with glass cloth or the like, and which is heated to a sufficiently high temperature and subjected to a force to cause the lead foil 76 to conform to the surface underlying the same while the resin material conforms to the deformed shape of the foil. As a result, the counter retains its rear flat face but has a modeled surface which conforms to the shape of the laminate illustrated in FIG. 10, and thereby includes opposed integral conical projections 86 and 88.

After removal of the assembly from the molding machine, it is preferred that a series of aligned holes 90 be drilled therethrough for receiving a series of alignment pins 92 (FIG. 12) which may be of nylon stock. After drilling of holes 90 and insertion of pins 92 therein, the corners of the assembly having conical projections 86 and 88 therein as well as the corresponding openings 32 and 34 in die 30 may be removed. However, the cones 86 and 88 which mate in openings 32 and 34 are of importance in permitting disassembly of the laminate shown in FIG. 11 followed by removal of the lead foil and photosensitive sheet 56, yet permitting realignment of counter 74 with die 30 for drilling of holes 90 which receive pins 92.

It is preferred that the counter 74 be molded of a synthetic resin of the thermosetting type and which preferably upon final curing is sufficiently translucent that a design may be viewed therethrough when the counter is placed over a sheet having a design imprinted thereon corresponding to the design 12 engraved in master plate 10. The preferred synthetic resin material for molding counter 74 is a product identified as P–680, available from U.S. Polymeric Chemicals, Inc., Santa Ana, Calif., and which may be described as a diallyl isophthalate resin reinforced with glass fiber cloth.

Because of the unique manner in which the counter 74 is fabricated away from the press, the press platens may be set up for operation off of the machine. Makeready of the press platens for an embossing job utilizing counter 74 against phenolic duplicate die 30 first involves mounting a printed sheet having a design thereon of the type engraved in plate 10, on the lower press platen utilizing a suitable adhesive. Next, the premade counter 74 having a layer of contact cement or adhesive on the rear flat face thereof is positioned over the printed sheet so that the raised portion 94 of the counter 74 which conforms exactly with design 12, is aligned with the corresponding printed portion of the sheet, whereupon the counter is then brought into engagement with the printed sheet for firm fixation to the upper surface thereof. The adhesive used on counter 74 should be of a type permitting small adjustments of the disposition of the counter relative to the printed sheet as may be necessary to bring the raised area 94 into exact alignment with the printed design.

Following fixation of the counter 74 to the lower press platen, the die 30 is placed over counter 74 with pins 92 being used to assure correct alignment of the die with the counter. The rear face of die 30 is then coated with an adhesive whereupon the assembly of the upper press platen and hot plate may be brought into engagement with the back surface of the die 30 in such manner as to cause the die to become firmly affixed to the downwardly facing surface of the hot plate. In this respect, it is to be understood that the press platens during interfitting of the counter with the die are maintained in proper registration off of the machine through the use of conventional close tolerance pins which fit in corresponding openings therefor when the plates are brought into their normal proximal relationship. After mounting of the press platens on the embossing machine, the platens may be separated for removal of alignment pins 92.

The relative positions of die 30 and counter 74 during normal embossing operations is illustrated schematically in FIG. 13 wherein it can be seen that the background relief provided in counter 74 assures proper deformation and embossing of the sheet of paper 96 or the like without any tendency for the paper to be cut by the design defining edges of the die or the portions of the paper surrounding the design being unduly ironed or de-embossed by the mating embossing members. The paper clearance provided in the counter also contributes to elimination of cutting of the paper or undesirable ironing thereof.

Although the preferred process above suggests molding of the die 30 and counter 74 in a plate compression machine, it is to be understood that various techniques may be employed for effecting molding of these components including the use of compression molding equipment employing nonshrink phenolic synthetic resin materials, or injection molding apparatus. Similarly, the die 30 may be fabricated using electroform forming techniques wherein a metal shell is deposited over the reverse 22 and the shell then backed up with metal or an epoxy composition. Another alternative procedure would be to gas plate a metal deposit over the reverse with nickel being the preferred material in this respect utilizing nickel tetracarbonyl $Ni(CO)_4$ as the composition from which the nickel is deposited. In this respect it is to be appreciated that electroforming and gas plating techniques can also be used for the construction of reverse 22 against original plate 10, with it only being necessary to provide a conductive parting agent over the plate to permit electro-deposition of a deposit thereover and to also permit removal of the deposited shell therefrom.

Although the counter and die fabrication procedures previously described in detail have related to the production of flat counters and embossing dies usable therewith, it is to be understood that the steps are equally applicable to the construction of counters and dies for use in rotary embossing operations. The principal additional operation required involves photographically depositing on the magnesium alloy plate 10, prior to engraving thereof, an image corresponding to design 12 which has been optically distorted in a known manner so that when the design is reproduced on a member which is adapted to be wrapped around a cylinder forming a part of a rotary press, the design impressed in a flat sheet passed therebetween will conform to the original design rather than be distorted. In addition, the counter and die produced in accordance with the described process should be fabricated in such manner that they may be bent around respective cylinders of the rotary press without cracking or crazing. Insofar as the counter is concerned, an exemplary thermosetting synthetic resin material for this purpose is Vibrin-Mat G–1600 furnished by U.S. Rubber Co., Naugatuck, Conn.

The optically distorted, artist-engraved magnesium alloy plate 10 may also be used to prepare a rotary embossing die which for example, may be electroformed of a thickness adapting the same to be wrapped around a supporting cylinder therefor forming part of the embossing machine and in this respect, a backing for such electroformed shell is not required. The counter and die should both be blanked and pierced at opposite ends thereof in a conventional manner to permit interleafing of the fingers thus presented so that mounting of the die and counter to respective supporting cylinders of a rotary press is facilitated.

Having thus described the invention what is claimed as new and desired to be secured by Letters Patents is:

1. In a method of constructing an embossing die counter having a raised modeled surface conforming to a design to be embossed in a sheet of material and provided with background relief around said design, said method including the steps of:

preparing a mask having a generally opaque area substantially conforming to the configuration of said design and a generally clear area surrounding the opaque area;

positioning the mask over a photosensitive sheet having a thickness substantially equal to the background relief desired in said counter;

exposing the assembly of the photosensitive sheet and said mask to rays of energy which pass through the clear area of the mask and are capable of effecting hardening of those portions of the photosensitive sheet which are subjected to said rays;

developing the exposed sheet to remove the unhardened portions therefrom; and forming a matrix against the developed sheet after removal of the mask therefrom and while the sheet is supported on the modeled face of a plate having said design in intaglio relief therein and with the design presented in the sheet aligned with the relieved design in said plate to produce said counter.

2. A method as set forth in claim 1 wherein is included the step of engraving said design in the planar surface of a member to present said plate.

3. A method as set forth in claim 1 wherein is included the steps of engraving said design in the planar surface of a member, and forming a replica of said member to present said plate.

4. A method as set forth in claim 3 wherein the steps of forming said replica include molding a reverse against the engraved surface of said member and then molding a duplicate against the modeled face of the reverse to present said plate.

5. A method as set forth in claim 3 wherein is included the step of forming said replica of a thermosetting synthetic resin having minimum shrinkage during curing thereof.

6. A method as set forth in claim 5 wherein is included the steps of forming said replica of a thermosetting synthetic resin impregnated with glass cloth to increase the strength of the replica and minimize shrinkage of the resin during curing thereof.

7. A method as set forth in claim 1 wherein preparation of the mask includes the steps of positioning a pressure sensitive film over the modeled surface of said plate, said film having the characteristics of normally being nontransparent but subject to being converted to transparent form in those areas where pressure is applied thereto while support is provided for the area of the film on which the force is applied, and imparting a multiplicity of repetitive, substantially point applied forces to the exposed face of the film while positioned on said plate whereby the areas of the film backed up by the unrelieved sections of the plate are converted to transparent form.

8. A method as set forth in claim 7 wherein is included the step of dyeing the remaining nontransparent portions of the film to present said opaque area thereof.

9. A method as set forth in claim 7 wherein is included the step of applying said repetitive forces to a film comprising a transparent backing element provided with a coating on one face thereof having a large number of relatively small, pressure rupturable cells therein.

10. A method as set forth in claim 1 wherein the forming of said matrix includes the steps of molding a matrix of a thermosetting synthetic resin against the developed photo-sensitive sheet.

11. A method as set forth in claim 10 wherein is included the step of molding the matrix against said developed photo-sensitive sheet employing a thermosetting synthetic resin which is characterized by the property of being translucent upon curing thereof.

12. A method as set forth in claim 1 wherein is included the steps of providing a relatively incompressible, pressure deformable mat over the developed photosensitive sheet, said mat being of a thickness substantially equal to the paper clearance desired for the particular counter, and forming said matrix against the exposed face of the mat under pressure conditions causing the mat to substantially conform to the face of the developed sheet and said plate thereagainst whereby the surface of the matrix against the mat conforms to the adjacent deformed surface thereof.

13. A method as set forth in claim 12 wherein is included the step of placing a layer of lead foil over said developed photosensitive sheet to provide said mat thereover.

References Cited

UNITED STATES PATENTS

| | | | |
|---|---|---|---|
| 3,005,364 | 10/1961 | Broderick | 76—107 |
| 3,255,006 | 6/1966 | Bailey | 96—36 |
| 3,341,329 | 9/1967 | Blake | 96—36 |

BERNARD STICKNEY, Primary Examiner

U.S. Cl. X.R.

96—35.1; 101—32